United States Patent [19]

Ingram

[11] 4,225,068
[45] Sep. 30, 1980

[54] LUGGAGE RACK

[76] Inventor: Charles E. Ingram, 13703 Hendrick, Warren, Mich. 48089

[21] Appl. No.: 946,579

[22] Filed: Sep. 28, 1978

[51] Int. Cl.³ ............................................. B60R 9/04
[52] U.S. Cl. ................................. 224/325; 224/314; 52/665; 211/190; 403/252
[58] Field of Search ............... 224/309, 321, 325, 326, 224/330; 52/663, 667, 668, 656, 664, 712, 696, 716; 403/252, 254, 242; 211/190, 191, 192, 184; 248/224.3

[56] References Cited

U.S. PATENT DOCUMENTS

| | | | |
|---|---|---|---|
| 2,439,049 | 4/1948 | Lesko | 211/190 |
| 3,120,914 | 2/1964 | Smith | 224/326 |
| 3,253,755 | 5/1966 | Bott | 224/326 |
| 3,951,320 | 4/1976 | Bott | 224/326 |
| 4,027,855 | 6/1977 | Lauzier | 403/252 X |
| 4,124,155 | 11/1978 | Kowalski | 224/326 |

Primary Examiner—Robert J. Spar
Assistant Examiner—Jerold M. Forsberg

[57] ABSTRACT

A luggage rack for carrying luggage or the like on an automotive vehicle. The luggage rack is mounted on the trunk lid of the vehicle and comprises a pair of spaced, multi-sided, load carrying cross rails and a pair of side rails and a plurality of center rails therebetween extending front to rear between the cross rails. Locking members located at the opposite ends of the side and center rails are cooperably connected to the cross rails and are engaged by a cover member slidably carried by the side rails so as to secure the side and center rails to the cross rails. The luggage rack includes a plurality of stanchion members for supporting each end of the cross rails. Each stanchion member has a lower end portion adapted to be fixedly secured to the vehicle. The cross rails, center rails and side rails are made from roll formed sheet steel, and the side and center rails are provided with upwardly facing grooves running lengthwise thereof to provide a means for the attachment of decorative and protective plastic strips.

5 Claims, 4 Drawing Figures

LUGGAGE RACK

BACKGROUND OF THE INVENTION

I. Field of the Invention

The present invention relates generally to a means for carrying luggage and the like on automotive vehicles and, more particularly, to a new and improved luggage rack having a unique construction to facilitate the simple and economic assembly of the luggage rack and to permit the luggage rack to be mounted on an automotive vehicle.

II. Description of the Prior Art

Luggage racks and similar article carriers adapted for attachment to vehicles are well-known in the prior art. Many of these luggage racks include a variety of fastening means for attaching cross rails to side rails. The carriers generally are designed and constructed in such a manner that they are attractive in appearance and are relatively inexpensive to manufacture, yet strong and durable in construction. Most such luggage racks known to the inventor include conventional fastening devices, such as metal screws, for attaching the side rails to the cross rails. It would be desirable to provide such a luggage rack which does not require the use of conventional fasteners for attaching the various components thereof to one another.

III. Prior Art Statement

The prior art mentioned hereinbefore, in the opinion of applicant, represents the closest prior art of which the applicant is aware.

SUMMARY OF THE INVENTION

The present invention, which will be described subsequently in greater detail, comprises a luggage rack having a plurality of cross rails, center rails and side rails which are made from roll formed strips of sheet metal. The luggage rack of the present invention employs a pair of cross rails which extend laterally along the forward and rear edge of an automobile trunk lid. The cross rails have opposite ends which are matingly engageable with a plurality of stanchions that serve to support the luggage rack upon the vehicle trunk lid. The cross rails are interconnected by a plurality of center rails and side rails which are secured to the cross rails at laterally spaced locations in the form of apertures disposed in the inside surface of the cross rails. A cover member encompassing each of the cross rails slidably engages recessed sections formed on the outer ends of the side rails to lockingly secure the side rails to the cross rails.

It is therefore a primary object of the present invention to provide a new and improved luggage rack which is attractive in appearance and is relatively inexpensive to manufacture, yet one which is strong and durable in construction in that it employs a new and unique method for fastening the cross rails to the side rails.

It is a further object of the present invention to provide a new and improved luggage rack of the above character which features novel and inexpensive means for interconnecting the various components thereof and without exposing the various fastening means employed.

It is yet another object of the present invention to provide a luggage rack of the above character which may be easily prefabricated and then easily mounted on either the roof or trunk lid of an automotive vehicle.

It is still a further object of the present invention to provide a luggage rack of the type described which is strong, easily assembled, reasonable in cost and durable in construction.

Other objects, advantages and applications of the present invention will become apparent to those skilled in the art of luggage racks when the accompanying description of one example of the best mode contemplated for practicing the invention is read in conjunction with the accompanying drawing.

BRIEF DESCRIPTION OF THE DRAWING

The description herein makes reference to the accompanying drawing wherein like reference numerals refer to like parts throughout the several views, and wherein.

DESCRIPTION OF THE PREFERRED EMBODIMENT

Figure 1:
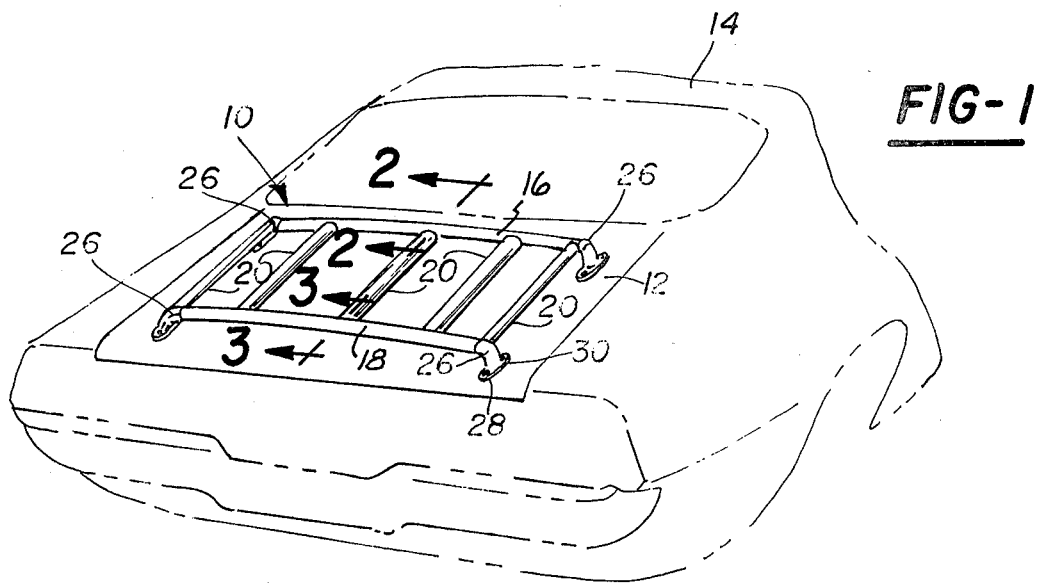
FIG. 1 is a perspective view of a luggage rack incorporating the principles of the present invention and wherein the luggage rack is illustrated as being mounted on the trunk lid of a fragmentarily illustrated passenger car.

Referring now to the drawing and, in particular, to FIG. 1 wherein there is illustrated one example of the present invention in the form of a luggage rack 10. The luggage rack 10 is shown operatively mounted on a substantially flat portion of a trunk lid 12 of a conventional automotive vehicle 14. The luggage rack 10 includes a pair of elongated, parallel cross rails 16 and 18 which extend along the trunk lid 12, respectively proximate the forward and rear edges of the trunk lid 12. The cross rails 16 and 18 are interconnected by a plurality of transversely extending, spaced center rails 20 which are secured to the cross rails 16 and 18 in a manner which will be described hereinafter. The cross rails 16 and 18 along with the side and center rails 20 are secured to the trunk lid 12 by means of a plurality of spaced stanchions generally designated by the numeral 16. Suitable fastening means 28, such as threaded metal screws, extend through the base portion 30 of each of the stanchions 26 and into the trunk lid 12.

Figure 3:
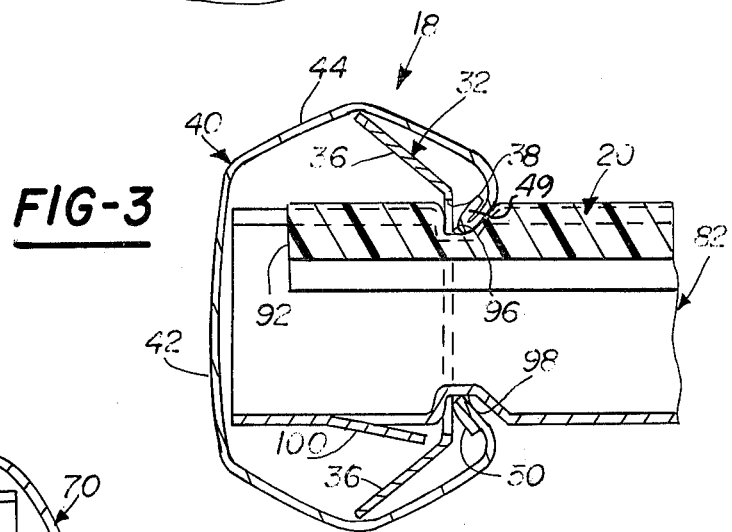
FIG. 3 is an enlarged, fragmentary, cross-sectional view of the juncture of one of the center rails and the rear cross rail taken along Line 3—3 of FIG. 1.
Figure 4:
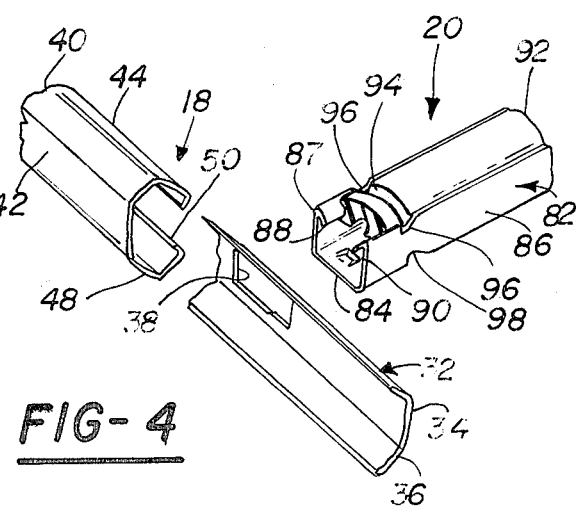
FIG. 4 is a fragmentary, exploded, perspective view of the rear cross rail and center rail juncture illustrated in FIG. 3.

As can best be seen in FIGS. 3 and 4 of the drawing, the rear cross rail 18 comprises an alignment member 32 having a base 34 and a pair of outwardly flared legs 36. The base 34 of the side rail member 32 is provided with a plurality of spaced, rectangularly shaped apertures 38 which serve as a means for securing the center and side rails 20 to the rear cross rail 18 in a manner which will be described in greater detail hereinafter. The rear cross rail 18 further comprises a cross rail cover 40 which has a base 42 and integral curved side walls 44 and 48 which, respectively, terminate in bent ends 49 and 50. The cross rail cover 40 and the cross rail member 32 are so sized with respect to each other that the cross rail cover 40 slidably and telescopically receives the cross rail member 32 when the luggage rack 10 is assembled in a manner to be described hereinafter.

As can best be seen in FIG. 2 of the drawing, the forward cross rail 16 is similar to the rear cross rail 18 in that the cross rail 16 comprises an alignment member 60 having a base 62 provided with a plurality of laterally spaced apertures 64 which are adapted to receive the end sections of the center rails 20 so as to secure the center rails 20 to the forward side rail 16 in a manner which will also be described hereinafter. The cross rail member 60 has a U-shaped cross section including legs 66 and 68 which extend laterally with respect to the base 62. The forward cross rail 16 has a cover 70 which extends the full length of the cross rail 16 and is adapted to slidably and telescopically engage the cross rail member 60 so as to enclose the same. Similar to the rear cross rail cover 40, the forward cross rail cover 70 functions not only to secure the lateral center rails 20 to the forward cross rail 16, but provides a means which enhances the decorative appearance of the luggage rack 10. The cover 70 has a curved base 72 and legs 74 and 76 which, respectively, terminate in double-bent ends 78 and 80. The purpose of the bent ends 78 and 80 will be described in greater detail hereinafter; however, it should suffice to say that they function to secure the center rails 20 to the forward cross rail 16.

Figure 2:
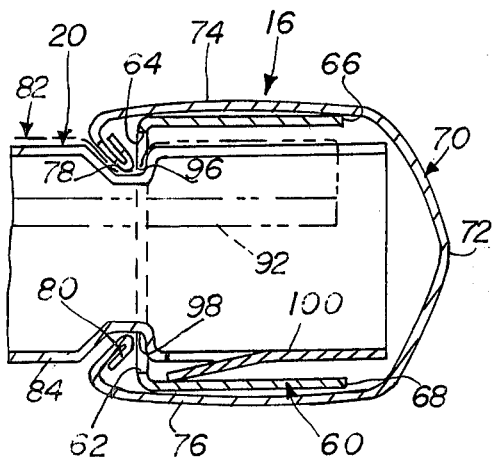
FIG. 2 is an enlarged, fragmentary cross-sectional view of the juncture of one of the center rails and the forward cross rail taken along Line 2—2 of FIG. 1.

As can best be seen in FIGS. 2, 3 and 4, each of the center rails 20 is identical and each comprises a U-shaped support member 82 having a base 84 and upstanding legs 86 and 87 which, in turn, respectively terminate in inwardly bent ends 90 and 88. The center rail support member 82 supports a decorative and protective, extruded elastomer strip 92. The bent ends 88 and 90 of the support member 82 function to engage mating recesses 94 formed on the elastomer strip 92 so as to securely attach the strip 92 to the center rails 20.

The upper edges of the legs 86 and 87, as well as the base 84, are provided with opposed recesses 96 and 98 (FIGS. 2 and 3). On the end of the center rails 20 associated with the rear cross rail 18, these recesses 96 and 98 are aligned with the elastomer strip recess 94 and are spaced from the outer ends of the support member 82 a distance which is equal to the width of the rear rail 18. At the end of each center rail 20 associated with the forward cross rail 16, the distance between the recesses 96 and 98 and the associated end of the support member 82 is equal to the width of the cover 70. It should be noted that the base 84 of each of the center rails 20 is provided with a punched-out tab 100, for a purpose which will be described hereinafter.

It should also be noted that the legs 86 and 87 are flat between the ends of the support member 82 and the recesses 96 and 98, whereas the support member legs 86 and 87 are provided with a bulged surface between the recesses. In addition to adding to the overall decorative appearance of the center rails 20, the bulged side walls 86 and 88 function to limit the amount of insertion of the center rails 20 into the apertures 38 and 64, as will be described hereinafter.

To assemble the luggage rack 10, the member 32 of the rear cross rail 18 is positioned parallel to and spaced from the member 60 of the forward cross rail 16. The opposite ends of the center members 20 are then inserted into the apertures 38 and 64, respectively, of the cross rail members 32 and 60 until the base 34 of the rear cross rail member 32 and the base 62 of the forward cross rail member 60 are aligned with the recesses 96 and 98. In this position further insertion of the center rails 20 into their associated apertures is limited by the abutment of the members 32 and 60 with the bulged side walls of the support member 82. Withdrawal of the center rails 20 is prevented by abutment of the inside surface of the cross rail members 32 and 60 with the punched-out tabs 100 (FIGS. 2 and 3).

In this mode the center rails 20 are now attached to the cross rail members 32 and 60 at the appropriate, laterally spaced locations. The cover 40 for the rear cross rail 18 is then slidably received onto one end of the member 34, encompassing the same as illustrated in FIG. 3. The bent ends 49 and 50, respectively, engage the recesses 96 and 98 as the cover 40 is slid over the entire cross rail member 32. In this position it should be noted that the outer edges of the center members 20 snugly abut the inside wall of the base 42 of the cover 40. Since the opposing edges of the bent ends 49 and 50 are sized to tightly grasp the recesses 96 and 98, the center members 20 are securely attached to the rear cross rail 18, which attachment takes place as the cross rail is assembled and without the need for any threaded fasteners or the like. In a similar manner, the cover 70 is slid over the cross rail member 60 such that the bent ends 78 and 80 of the cover 70, respectively, engage the recesses 96 and 98 of the center members 20 and securely attach the cover and elastomer strip 92, and thereby the forward cross rail 16, to each of the center members 20. The stanchions 26 may then be attached to the opposite ends of the cross rails 16 and 18 or to the side rails, and the luggage rack 10 is now ready for attachment to the automotive vehicle 14.

It can thus be seen from the foregoing description that the present invention provides a novel luggage rack wherein the various components thereof may be simply and easily secured to one another without the need for threaded members or other similar fastening devices.

While only one example of the present invention has been disclosed, it should be understood by those skilled in the art that other forms of Applicant's invention may be had, all coming within the spirit of the invention and scope of the appended claims.

What is claimed is as follows:

1. A luggage rack comprising:
   a pair of spaced cross rails, each of said cross rails comprising an alignment member having a plurality of apertures and a cover member encompassing said alignment member;
   a plurality of support members laterally disposed with respect to said cross rails and having opposite ends received by said apertures to connect said support members to said cross rails and to maintain said cross rails at a selected distance from each other;
   each of the opposite ends of said support members having recessed sections, said recessed sections being parallel to the longitudinally extending edges of its associated alignment member; and
   said cover members encompassing said alignment members and slidably engaging said recessed sections to lockingly secure said support members to said cross rails, whereby for assembly of the rack said cross rails are inserted into a respective one of said apertures in said alignment member and then said cover is slid on from one end of said alignment member sequentially and slidably engaging the recessed sections of each of said plurality of support members to lock the same together.

2. The luggage rack defined in Claim 1 wherein each of said support members has an upwardly facing groove running lengthwise thereof; and
   a protective strip secured in said upwardly facing groove.

3. The luggage rack defined in Claim 1 wherein said cross rails and support members are each fabricated from roll formed sheet metal.

4. The luggage rack defined in Claim 1 wherein each of the opposite ends of said support members is provided with punched-out tab portions over which said alignment members extend, said support members having enlarged wall sections beyond said recess sections such that said alignment members are restrained between said enlarged sections and said punched-out tab portions.

5. A luggage rack comprising:
   a pair of spaced cross rails, each of said cross rails comprising an alignment member having a plurality of apertures and a cover member encompassing said alignment member;
   a plurality of support members laterally disposed with respect to said cross rails and having opposite ends received by said apertures to connect said support members to said cross rails at a selected distance from each other;
   each of the opposite ends of said support members having recessed sections, said recessed sections being parallel to the ends of its associated alignment member; and
   said cover members encompassing said alignment members and slidably engaging said recessed sections to lockingly secure said support members to said cross rails, each of said support members having an upwardly facing groove running lengthwise thereof; and
   a protective strip secured in said upwardly facing groove, said protective strip extending to the opposite ends of said support member beyond said recess sections such that said cover member frictionally engages said protective strip so as to restrain said cover member from moving with respect to said support members.

* * * * *